March 5, 1935.  F. E. HARTMAN  1,993,404
DRYING OF PRINTING INKS
Filed March 7, 1931
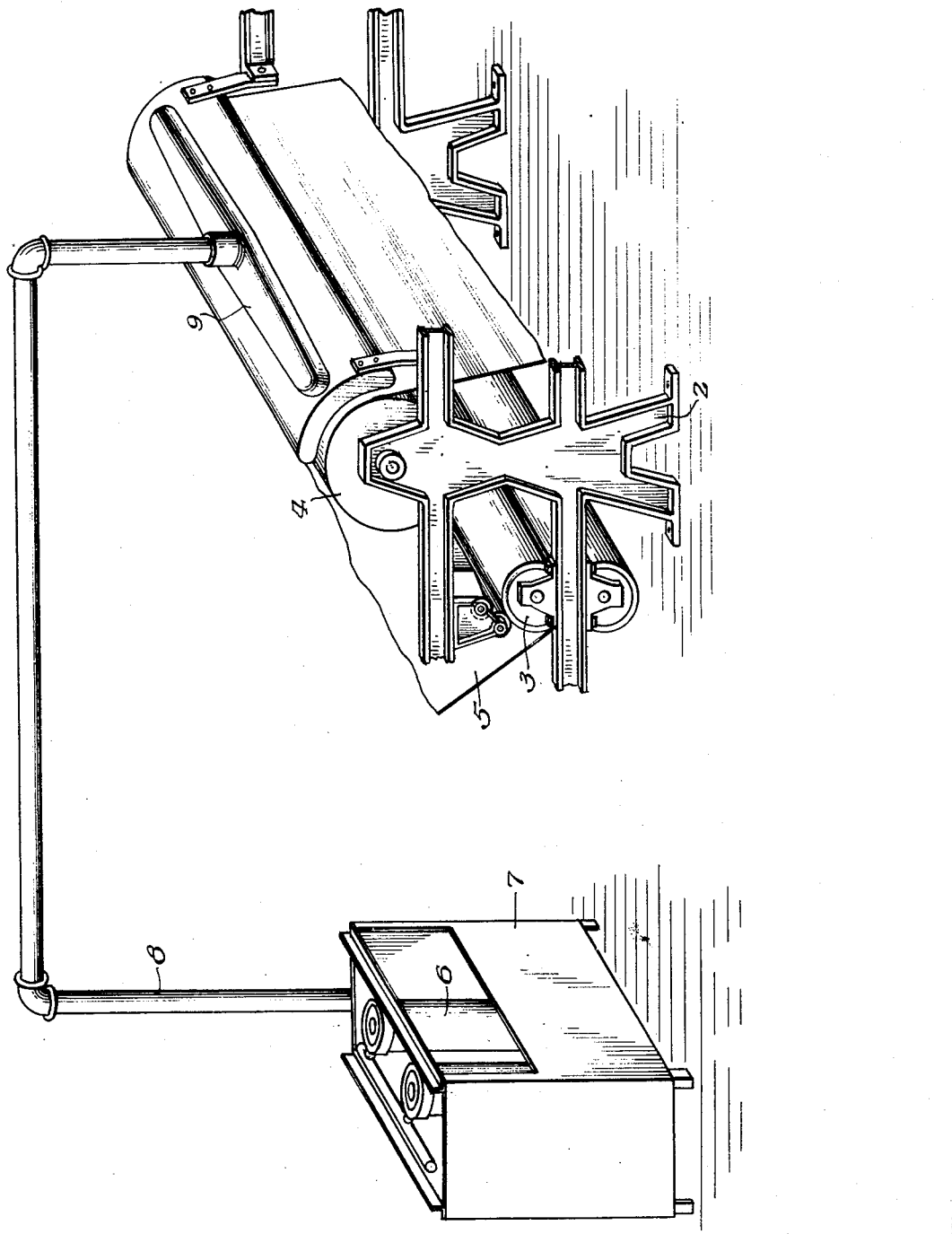
Inventor
Frank E. Hartman
By Patented Mar. 5, 1935

1,993,404

UNITED STATES PATENT OFFICE 1,993,404

DRYING OF PRINTING INKS

Frank E. Hartman, Chicago, Ill., assignor of one-third to Fred H. Montgomery and one-third to W. Ray Montgomery, both of Chicago, Ill.

Application March 7, 1931, Serial No. 520,891

1 Claim. (Cl. 101—416)

The invention relates to the drying of printing inks.

A problem in lithography and the printing of colors has existed in connection with the drying of the inks. When cylinder or rotary presses are used and the colors are successively impressed, it is necessary that the ink applied dry or set sufficiently to prevent smear or run before the next color is applied. When the colors are applied successively it is necessary to allow sufficient time for each color to dry between the impressions and when this is done, the problem of perfect registry becomes a factor. Paper is hygroscopic and will warp or shrink according to the humidity of the air surrounding it. When separate press runs for each color are made, expensive air conditioning apparatus is required to control the humidity of the air, if perfect registry is to be attained. Even with the use of air conditioning apparatus, the mechanical difficulties of registry are not all obviated. A desideratum in color printing has been to impress the colors in rapid succession on the press and in a single run. To achieve the desired result, the first color must be set in the fraction of a second required for the web or sheets printed to pass from one impression roller to the other. It is also frequently desirable to print colors on both sides of the paper at once. When this is attempted, it is essential that the ink of each impression set before it passes to the backing up or tympan roll, since the printed surface of the paper must pass across the face of this roll.

It has been heretofore proposed to blow ozonized air upon the surface of the paper immediately after printing; sometimes in the presence of heat. So far as I am aware, however, commercial efficiency has not been attained in this method, because when the conventional type of ozone apparatus is used, the volume of the ozonized air necessary to be effective for the purpose of quickly drying the ink between impressions in the same run would require ozone apparatus so large that it could not be practically applied in printing establishments.

Experiments conducted by me have demonstrated that ozone in low concentrations behaves quite differently in the presence of many oils than it does in much higher concentrations, and that ozone per se, even in the presence of heat does not effect the complete drying reaction in the intervals between impressions when made successively in a single run.

It has also been found that the catalytic effect of ozone is negligible insofar as its usefulness in obtaining instantaneous drying effects are concerned.

In other experiments I have found that when oxygen is passed through an energized ozone generator only part of the oxygen is converted into ozone, and the accompanying unozonized oxygen is highly ionized and activated; that the state of activation is of exceedingly short duration, and that when increasingly high frequencies of alternating current are employed for the production of ozone, the activity of the accompanying oxygen increases proportionately as the frequency, up to about 1000 cycles. If the frequency is carried above 1000 cycles there is a tendency for this activity to fall off.

An ozone generator offers a capacitive reactance to the flow of alternating currents, and as a result, the amount of energy that a given generator will absorb, for the same potential difference, is directly proportional to the frequency. The yield of ozone from a given generator is directly proportional to the amount of energy absorbed, whilst the concentration of ozone is inversely proportional to the rate of air flow through the generator, for a given energy absorption. The yield of ozone in grams per kw. h. is greater the lower the concentration, thus it is seen that the energy requirement, per unit volume of air, is very high, relatively speaking, in order to produce high concentrations of ozone. It has also been found that the activity of the accompanying oxygen is directly proportional to the concentration of ozone. For example, at a concentration of nine milligrammes of ozone per litre of air, the accompanying oxygen will attain an activity of 12 in arbitrary units, whereas at a concentration of 4.5 milligrammes per litre the activity of the oxygen falls to no more than three. This activity of the oxygen is determined by chemical effect, and is entirely independent of the volume involved.

It is seen then that to obtain a high concentration of ozone, with an accompanying high activity of the oxygen the rate of air flow must be very low with respect to the quantity of energy involved. In the case of the conventional low frequency ozone generator, about the maximum energy absorption that can be obtained at 60 cycles is the matter of some 200 watts. In order to produce a concentration in air of nine mgs./litre the air flow must be reduced to about six or seven litres per minute. In order to convey the proper quantity of nine mgs./litre ozone to a commercial size cylinder press in order to dry ink, not less than 1200 litres per minute are required, then if the flow of air through each generator is a matter of six litres per minute, 200 ozone generators will be required. The absolute minimum space that this number of ozone generators could be crowded in would be 140 sq. ft. or a space 10 feet by 14 feet, or as much space as the press itself would require. Now to obtain the proper degree of activity in the accompanying oxygen the low frequency generators must be located immediately alongside of the press. To a commercial house, employing a number of presses, this would virtually require doubling the size of their press rooms.

Now from the above it thus appears that what is required is to bring 1200 litres of air per minute under the influence of an ozonizing discharge expending a total energy of 40 kw. The rate of energy absorption of an ozone generator, with increasing frequency is as 16.6 is to 1 for an increase from 60 cycles to 1000. Thus if 1000 cycle current was used each generator would absorb 3.32 kw. instead of 0.20 kw. Thus for 40 kw. only 12 ozone generators would be required in the place of 200. This reduces the floor space requirement from 140 sq. ft. to 7.5 sq. ft., and due to the higher activation of the oxygen through the influence of higher frequency, I have found that at a frequency of 960 cycles per second, I can obtain the same results with 30 kw. of power in the discharge, as opposed to a 40 kw. requirement with 60 cycles.

My improved method consists in providing a sufficient number of high-frequency alternating current ozone-generators of the type shown and set forth in my application for patent filed March 7, 1931, Serial No. 520,892, at one side of and as closely as possible to the printing press adjacent each impression roll, charging the generators with energy at say 960 cycles and forcing air through the generators to produce ozone and highly activated and ionized oxygen. The ozone and oxygen is then delivered, for example, through a perforated pipe extending transversely of the direction of travel of the web or sheet and providing it with perforations to jet the fluid onto the ink while the oxygen remains highly ionized and activated to dry the ink so quickly that it will set before the web or sheet reaches the next impression roll of the press. As a result, several impressions of different colors may be made in a continuous run of the web or sheets through the press, and the successive colors applied will be in perfect registry.

In my experiments on drying oils with ozone I have found that when low concentration ozone is employed the action of the ozone is purely that of an oxidant. When a higher concentration, as aforesaid, is used, or the oxygen accompanying the ozone is in a state of high activity, the action is both that of an oxidant (due to ozone) and that of a catalyst (due to the activated oxygen). The activated oxygen acts as a catalytic agent in this case, since the activated molecules are ionized and excited through an absorption of energy (light quanta) from the discharge, this energy is transmitted to the molecules of oil thus inducing internal changes of either polymerization or metamerization, which produces the change in physical state that produces dryness.

In the drawing which accompanies and forms a part of this specification or disclosure, an apparatus is shown for carrying out the improved method. In this drawing the numeral 1 designates a multi-color press which consists of a pair of side frames 2. The latter support a printing roll 3 and a drier roll 4. A web 5 of paper extends under the printing roll 3 and over the drier roll 4 and is adapted, when the press is in operation to be fed continuously around the two rolls for printing purposes. The drier roll 4 is arranged so that the web 5 after printing thereof by the printing roll 3 passes thereover. Ozone and highly ionized and activated oxygen is supplied to the printed portion of the web from a pair of ozone generators 6. The latter, as shown in the drawing, are located at one side of the press and are disposed in a box-like housing 7. A pipe 8 is connected to receive the ozone and highly ionized and activated oxygen from the generators 6 and is provided at its discharge end with an applicator 9. The latter extends longitudinally of, and is positioned immediately above, the drier roll 4. It is in the form of a pipe-like element and has a plurality of perforations or apertures (not shown) whereby the ozone and highly ionized and activated oxygen is delivered against the printed face of the web as the latter passes over the drier roll 4. As the web passes over this roll the ink on the printed face thereof is immediately dried as the result of the action of the ozone and highly ionized and activated oxygen. The electric generators 8 are charged with current at approximately 960 cycles per second so that the air which is delivered thereto is formed into ozone and highly ionized and activated oxygen, which as heretofore pointed out serves as an efficient drying medium for the printed web.

Whereas one form of apparatus for carrying out the method is shown in the drawing, it is to be understood that other forms and types of apparatus may be employed. It is also to be understood that the invention is not to be understood as restricted to the details set forth, since these may be modified within the scope of the appended claim, without departing from the spirit and scope of the invention.

Having thus described the invention, what I claim as new and desire to secure as Letters Patent, is:

That improvement in drying ink on a web or sheets passing through a printing press which consists in subjecting air to electric energy in an ozone generator charged with current at approximately 960 cycles per second in order to produce ozone and highly ionized and activated oxygen, and delivering the ozone and highly ionized and activated oxygen to the place where the ink is applied to the web or sheets while the oxygen remains highly activated and ionized, so it will have the action of an oxidant and that of a catalyst.

FRANK E. HARTMAN.